Oct. 23, 1956 W. M. RUST, JR 2,768,374

RADIO FREQUENCY SURVEYING SYSTEM

Filed June 1, 1953 4 Sheets-Sheet 1

INVENTOR.
William M. Rust Jr.,
BY Dwight C. Ati
AGENT

INVENTOR.
William M. Rust Jr,
BY Dwight C. Otis
AGENT.

RADIO FREQUENCY SURVEYING SYSTEM

Filed June 1, 1953

4 Sheets-Sheet 3

INVENTOR.
William M. Rust Jr.,
BY Dwight C. Otis
AGENT.

INVENTOR.
William M. Rust Jr.,
BY Dwight C. Otis
AGENT.

2,768,374

RADIO FREQUENCY SURVEYING SYSTEM

William M. Rust, Jr., Houston, Tex., assignor, by mesne assignments, to Esso Research and Engineering Company, Elizabeth, N. J., a corporation of Delaware Application June 1, 1953, Serial No. 358,764

5 Claims. (Cl. 343—105)

The present invention relates to a system and method for measuring distances and directions between spaced points by means of radio waves. More specifically stated, the invention is concerned with a long range system and method of navigation, or surveying, wherein a plurality of stations, at different times, radiate continuous radio wave trains having a single frequency or wavelength, and distances are determined by comparison of phase measurements on the several trains of waves.

This application is a continuation-in-part of my copending application Serial No. 220,798, filed April 13, 1951, now abandoned.

A variety of systems for measuring distances and/or directions by means of radio waves is known in the prior art. The known systems and methods may be classified in several different ways. One scheme of classification is based upon the types of waves, i. e. modulated or unmodulated radio waves. Another scheme is based upon the nature of the measurements obtained, such as phase, travel time, or relative intensities. Still other schemes of classification are based upon particular techniques employed.

In practical operations using modulated radio waves, a frequency of several megacycles must be employed if an accuracy in the range of 10 to 1000 feet is desired. Employment of these high frequencies tends to limit the reliable surveying range of modulated systems approximately to line of sight or, in rugged or heavily wooded terrain, to a relatively few miles. If unmodulated (i. e. continuous) waves are employed, measurements of range, or of differential range, are usually obtained by making phase measurements upon the waves. This makes possible an accuracy of $1/100$ of a wavelength or better so that a basic frequency as low as 10 kilocycles may be employed if desired. Because of the differences in the manner of propagation of high and low frequency waves, relatively low frequency unmodulated waves make possible reliable and accurate surveying over considerably greater distances than high frequency modulated waves and are, accordingly, preferred for long range surveying or navigational purposes. However, one of the primary technical problems involved in continuous, or unmodulated, wave phase methods is the fact that it is possible to compare the phases of two signals only if the two signals are present simultaneously and are of the same frequency. Obviously such comparison of radio signals transmitted from two or more transmitters cannot be made directly.

Prior workers have proposed several solutions to this problem. In one of these solutions, a continuous wave signal is transmitted from a first station to a second station and is there used to modulate the frequency of a signal which is retransmitted to the first station. The frequency modulated signal is demodulated at the first station and the phase of the modulation is there compared with the phase of the original continuous wave signal. Since the frequency modulated signal must, for practical reasons, be much higher in frequency than the continuous wave signal, the range of the system is limited by the transmission characteristics of the high frequency signals.

In a second solution of the problem, the basic frequency is not that of any radiated signal but is a multiple of several different radiated signals. Thus, for example, the basic frequency at which phase comparisons are made may be 300 kc. (kilocycles) per second, while signals radiated from at least two stations in the system may be 100 kc. and 75 kc., respectively. The radiated signals are multiplied by three and four, respectively, before phase comparison measurements are made. Although one or more systems of this type have been designed and tested experimentally and have been found to satisfy fully the requirements for a long range navigation system, they have not been adopted in commercial practice for the reason that the use of two signal frequencies per coordinate of position is wasteful of spectrum space and the fact that two frequencies (three or four in practice, since a single coordinate is not enough to fix a position) must have an exact ratio to each other makes the problem of frequency allocation very difficult. The fact that the basic frequency must be substantially higher than any of the radiated signals also introduces technical problems which restrict the range of usable frequencies.

It is, therefore, one object of the present invention to provide a method and system for radio frequency surveying or navigation which requires the use of only a single frequency which may be arbitrarily chosen within a broad band of relatively low frequencies.

It is another object of the present invention to provide a method and system for radio frequency surveying or navigation which does not generate any substantial amount of side-band interference to other communication services.

A further object of the present invention is to provide a method and system for surveying or navigation which makes possible the determination of a plurality of coordinates of position by use of a single radio frequency channel.

Still another object of the present invention is the provision of an improved system and method for radio frequency surveying or navigation wherein the determination of one or more coordinates of position may be made by measuring phase relations of continuous wave radio signals having a single known frequency, said signals being radiated at prearranged, but different, times from a plurality of remotely spaced stations.

Other and further objects of the present invention will become apparent to those who are informed in the art of radio transmission.

Briefly stated, my invention contemplates a navigation or surveying system and method wherein a master station and one or more beacon stations, all operating on a single prearranged frequency, share time in radiating continuous wave radio signals analogous to the keyed, but otherwise unmodulated, continuous wave signals commonly employed in continuous wave radiotelegraphy. The operating time of the several transmitting stations in the system is cyclic in nature with each cycle of operation being subdivided into a plurality of fractions. All beacon stations and all mobile stations operating in the system apart from the master station are provided with local signal generators and with receivers tuned to the prearranged frequency of the master station. During fractions of each operating cycle when the master station is transmitting its master signal in the form of a relatively long dash of continuous waves, all of these local signal generators are adjusted to the precise frequency of the master station and the respective outputs of the local signal generators are adjusted to produce signals having a predetermined (and preferably zero) phase difference with respect to the master signal as received thereat.

During subsequent fractions of each operating cycle, each beacon station, in prearranged sequence, transmits an amplified facsimile of its locally generated and phase shifted beacon signal in the form of a relatively short dash of continuous radio waves. These beacon signals are received at each mobile station operating in the system and the phase of the received beacon signals is compared with the locally generated signal which has already been phase shifted, if required, to a predetermined phase difference with respect to the master signal. From the resulting comparison, phase information indicative of the range of the mobile station from the beacon stations or of the differential range from the master and beacon stations is obtained. Timing means which is synchronized at the mobile and beacon stations in response to the relatively long master signal, controls switching mechanism at these stations to insure operation in proper sequence.

Like all phase comparison systems of the prior art, it may be seen that, in using the method and system of the present invention, possible ambiguities as to position of each mobile station with respect to the beacon stations must be resolved by other or auxiliary means. Thus, the position and approximate range of each mobile station with respect to each beacon station must be known from the auxiliary means to an accuracy of about one-half wavelength at the known frequency. However, by using an auxiliary system operating at a second frequency which is preferably, but not necessarily, exactly 10% or 5% higher than the known basic frequency, the preliminary accuracy requirement may be relaxed to 10 or 20 wavelengths, respectively. In practice, such modification is sufficient to eliminate any real ambiguity.

The method and appaartus of the present invention may be better understood from the following description when read in conjunction with the accompanying drawing in which Figure 1 is a chart illustrating one arrangement of a system having a plurality of beacon stations and a mobile station carrying a master, or control, signal generator in accordance with one embodiment of my invention;

Figures 1, 2:
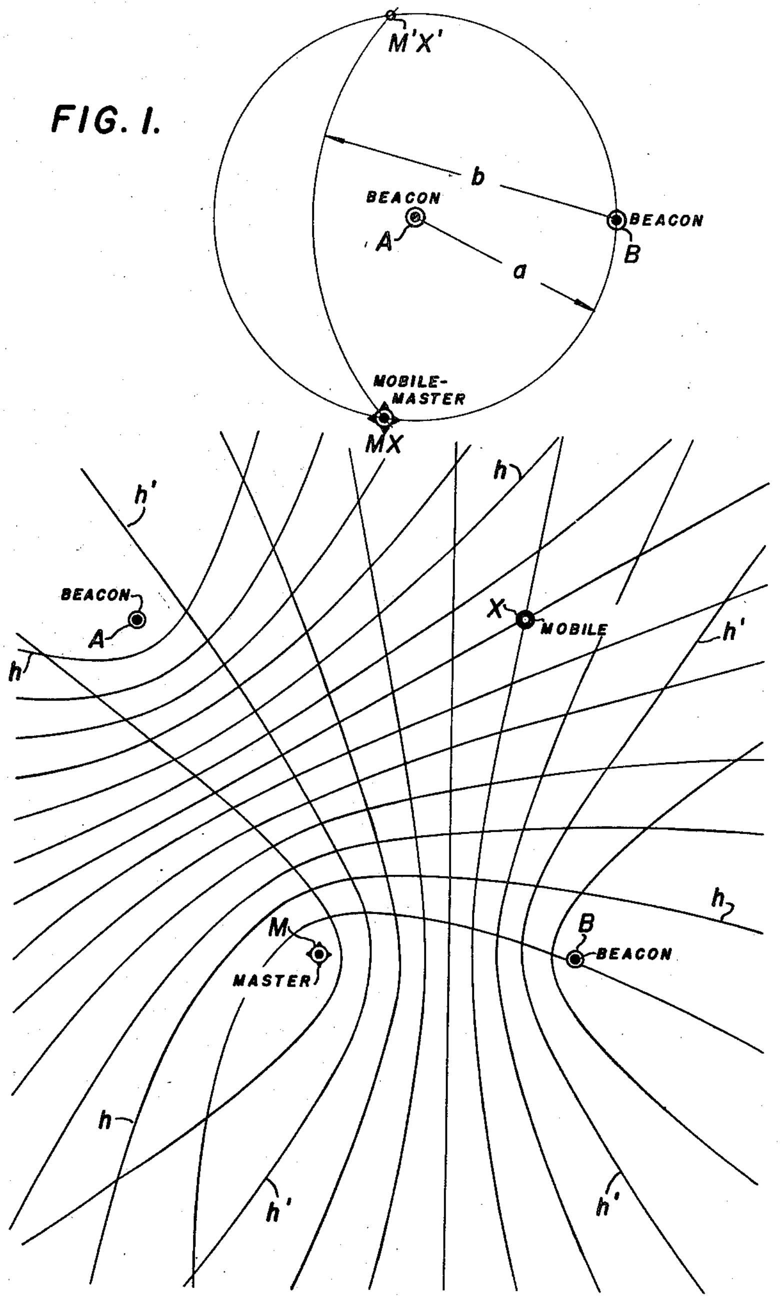
Figure 2 is a chart illustrating an arrangement of a system employing a plurality of beacon stations, a fixed master station, and a mobile station in accordance with a preferred embodiment of my invention.

Referring first to Figure 1, the letters A and B designate radio transmitting and receiving stations which, for purposes of description herein, will be termed "beacon stations." For most navigation or surveying purposes, beacon stations A and B are preferably arranged at geographically fixed locations spaced 10 miles or more, and preferably 50 to 100 miles, apart. Under certain circumstances it may be desired to operate these stations as intermittently or continuously movable reference stations. The letters MX designate a radio transmitting and receiving station adapted to be moved from place to place, to transmit radio signals to beacon stations A and B and to receive and make phase measurements upon radio signals received from said beacon stations.

Figure 3:
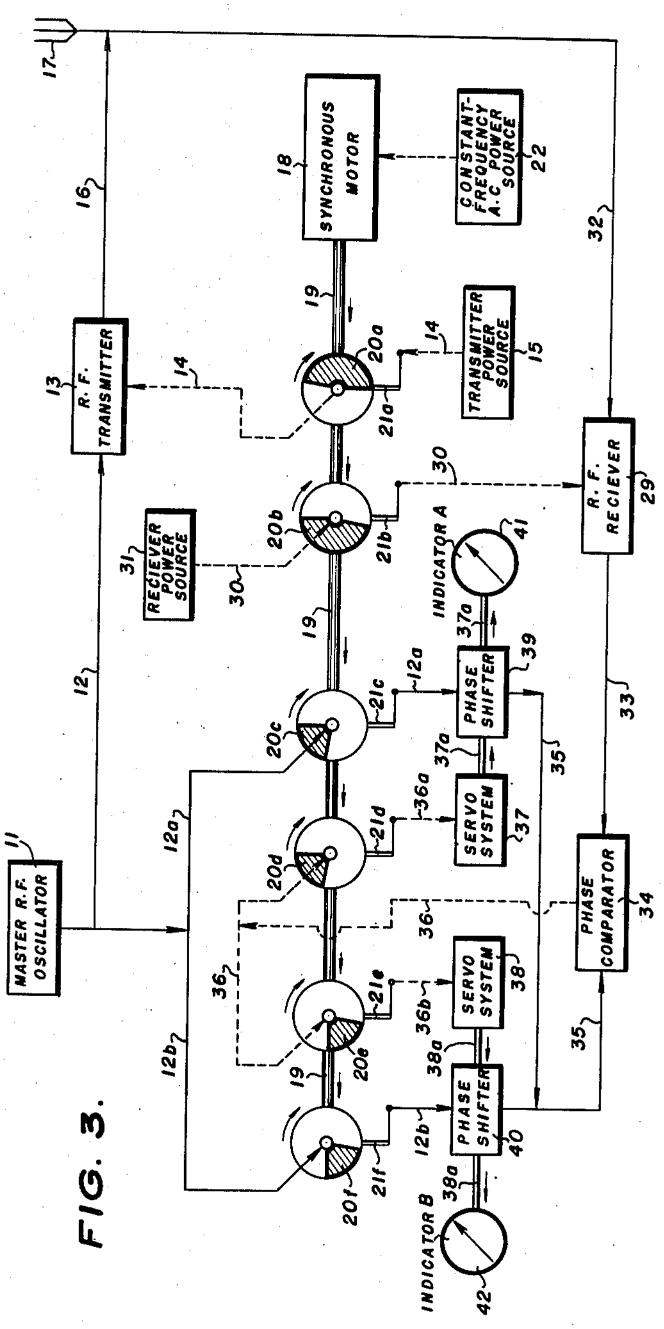
Figure 3 is a block diagram of an electrical circuit which may be used as a mobile-master station in the embodiment of my invention illustrated in Figure 1.

As will be more fully described in conjunction with a description of Figure 3, mobile-master station MX is provided with means for continually generating master radio frequency signals having an accurately known frequency, and means for radiating these signals in the form of continuous radio waves during a first fraction of a prearranged and recurring time cycle. The waves radiated from the master station MX are intercepted at beacon stations A and B. As will be discussed more fully in conjunction with a description of Figure 5, each of these beacon stations is provided with adjustable means for continually generating radio frequency signals having substantially the known frequency of the master station. During the first fraction of the timing cycle, the signal generating means at each of the beacon stations is caused to be adjusted to precisely the frequency of the master station, and the phase of the output of each beacon signal generator is shifted to a predetermined, preferably zero, phase difference with respect to the master signals as received at the respective beacon stations. During successive other fractions of the timing cycle, beacon stations A and B, in prearranged order, radiate the respective phase-shifted beacon signals in the form of continuous radio waves of essentially the known frequency generated by the master oscillator carried by mobile-master station MX. Each of the radiated beacon signals is intercepted, in turn by receiving equipment carried by the mobile station and the phase of each received signal is compared with the phase of a signal derived from the master oscillator. The resulting phase differences may be displayed or automatically recorded, as desired.

As will be apparent to those familiar with radio or electrical transmission, the aforementioned phase differerences may be expressed as fractions of a wavelength at the known frequency. By keeping a continuous record of the number of whole wavelengths of distance which mobile station MX moves with respect to each of beacon stations A and B, and by adding thereto the respective fractional wavelengths derived from the phase difference measurements, the total distance from each beacon station, and hence the position, of the mobile station may be determined.

Thus, in Figure 1, if the distance of mobile station MX from beacon station A is the distance "*a*" wavelengths, the mobile station must be somewhere upon a circle whose center is at A and whose radius is "*a*" wavelengths. Similarly, if the distance from beacon station B is "*b*" wavelengths, the mobile station must be somewhere upon a circle centered at B and having a radius of "*b*" wavelengths. From these data alone, it may be determined that the mobile station is either at the position MX or at the position M'X'. In practise, the operator of the mobile station will ordinarily know from other data his position with respect to a straight line which can be drawn between the positions of beacon stations A and B. However, in instances where ambiguity might result, it will be apparent that a third beacon station, spaced from stations A and B may be provided and phase measurements may be obtained on signals transmitted by this third station. The position of mobile master station MX can then be identified as being at the intersection of three circles.

It will be apparent that, where measurement of distance alone is required, the system described above may be simplified by omitting beacon station B, and by providing at mobile station MX, means for receiving signals and displaying phase differences with respect only to beacon station A.

A system such as has been described in connection with Figure 1 is useful primarily in situations wherein it is desired to operate a single mobile unit. Accordingly, I prefer to employ a system whose operation will now be described with reference to Figure 2. While, in the present description, reference will be made to a single mobile station X, it is to be understood that my invention contemplates the simultaneous operation of any desired number of similar mobile stations in accordance with this embodiment.

Turning now to Figure 2, it may be seen that I provide one or more beacon stations such as A and B which may be identical to the beacon stations mentioned in connection with Figure 1. Rarely will it be desirable to provide more than three beacon stations in any one system and generally it is advantageous to provide at least two such stations. As in the previously described embodiment, all of the beacon stations are preferably arranged at geographically fixed locations spaced 10 or more miles, and preferably 50 to 100 miles, apart. A master station M is arranged, preferably at a geographically fixed location, spaced a substantial distance from each of the beacon stations. Operating within the radio transmission range of the master and beacon stations are one or more mobile stations such as the mobile station X.

Figures 5, 6:
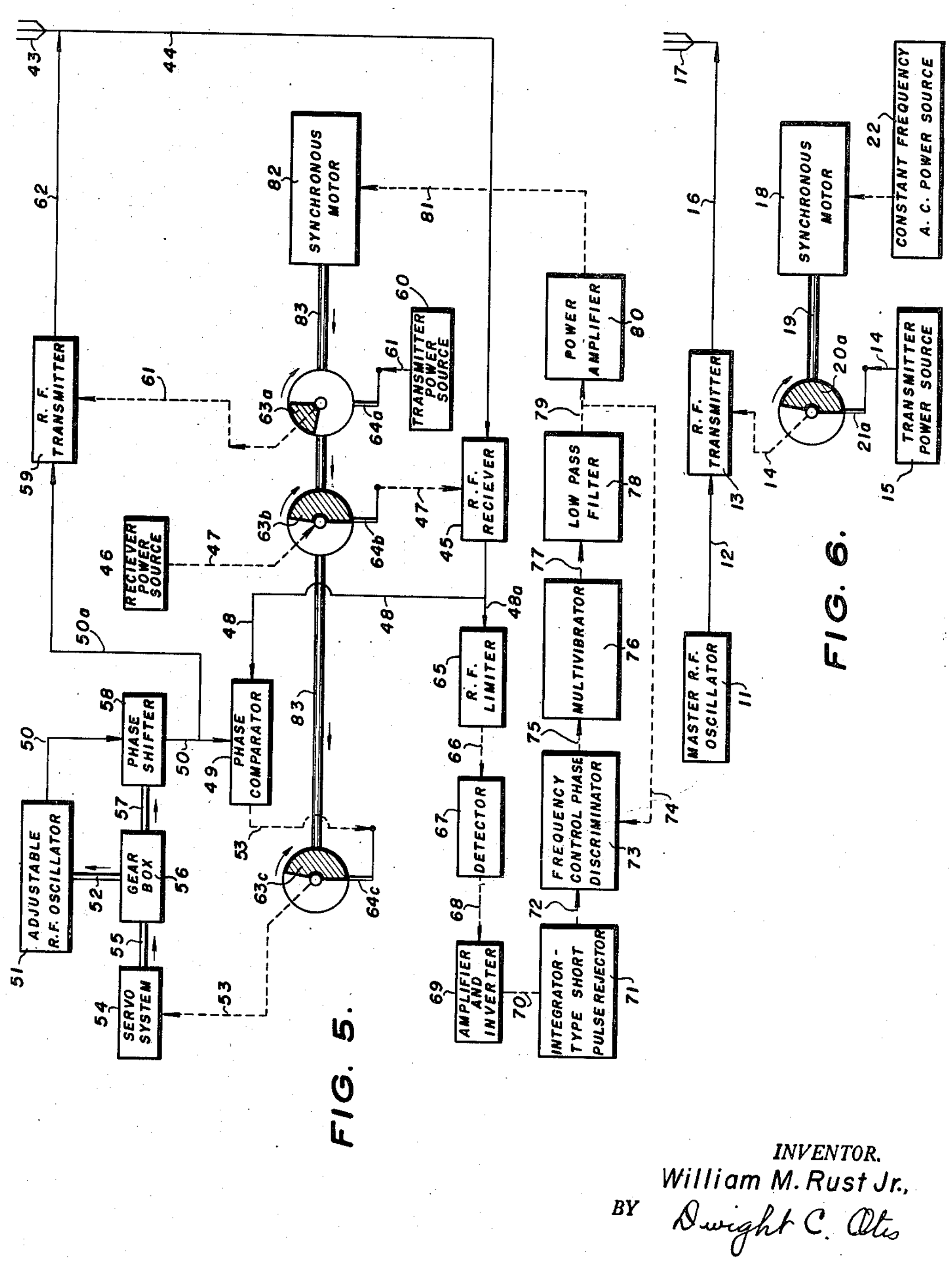
Figure 5 is a block diagram of an electrical circuit which may be used in each of the beacon stations shown in Figures 1 and 2.
Figure 6 is a block diagram of an electrical circuit which may be employed as a master or control station in the embodiment of Figure 2.

As will be more fully explained in subsequent description of Fig. 6, master station M is provided with means for continually generating a radio frequency signal having an accurately known frequency, and means for radiating said signal in the form of continuous radio waves during a first fraction of a suitable recurring time cycle. As in the embodiment of Figure 1, beacon stations A and B receive the radiated master signal during this first fraction of the time cycle and adjust respective beacon signal generators to provide beacon signals having the same frequency and a predetermined (usually zero) phase difference with respect to the received master signals. Mobile station X also receives the master station signals and, as will be more fully described with respect to Figure 7, adjusts the frequency and the phase of a local signal generator in similar manner to the adjustments at beacon stations A and B. Thereafter, during suitable other successive fractions of the timing cycle, master station M radiates no signal, and beacon stations A and B successively radiate phase-shifted beacon signals as in the previously described embodiment. These radiated beacon signals are received at mobile station X and the phase of each of the received signals is compared with the phase of the frequency- and phase-adjusted signal from its local oscillator. Phase differences are thereby obtained which, when expressed in terms of fractions of a wavelength at the operating frequency, are a function of the differential distance of station X from master station M and beacon station A or B. By recording the total number of full wavelengths of differential distance which mobile station X moves with respect to the master station and the respective beacon stations and adding thereto the above-mentioned fractional wavelengths, the position of station X may be plotted upon a suitable chart.

While it is possible to compute the position of mobile station X with respect to beacon stations A and B by employing circular coordinates of distance, as described in connection with Figure 1, it will generally be found more convenient to determine this position by employing hyperbolic coordinates of differential distance.

Since the derivation and use of hyperbolic coordinates of position are well understood by skilled workers in the arts of navigation and surveying, a detailed description thereof will not be given herein. It is believed sufficient to point out that a continuous wave signal transmitted from master station M is received at mobile station X with a phase change which is proportional to the distance MX and is received at beacon station A with a phase change which is proportional to the distance MA. If a second signal having zero phase difference with respect to the signal received from master station M be transmitted from beacon station A, then this second signal, when received at mobile station X, has a phase difference with respect to the signal received thereat from master station M which is proportional to the differential distance $MA+AX-MX$.

A series of hyperbolas, each representing the locus of all points with the same phase difference (or differential distance) of mobile station X with respect to master station M and beacon station A, may be plotted as shown by the series of curved lines *h* in Figure 2. Similarly, another series of hyperbolas *h'* may be drawn, each representing the locus of all points with the same phase difference (or differential distance) of mobile station X with respect to master station M and beacon station B.

Having described, by reference to Figures 1 and 2, the principles of operation of the navigation or surveying system of my invention, reference will now be made to particular elements and combinations of elements adapted to make up said system. To assist in distinguishing the functions of various elements to be described in Figures 3 and 5–7, inclusive, single solid lines have been employed to represent suitable conductors for carrying radio frequency potentials on which phase comparison measurements are made, broken lines have been used to represent suitable conductors for carrying subsidiary control potentials, and parallel pairs of solid lines have been employed to represent certain mechanical shafts or driving means.

In Figure 3 there is shown a block diagram of a electrical circuit adapted to be employed as the mobile-master station MX referred to in the description of Figure 1. For purposes of description it has been assumed that the apparatus of Figure 3 is to be used in a system which includes two beacon stations, such as A and B in Figure 1. As the description proceeds, however, it will become apparent that more or fewer elements may be employed if the system includes a greater or a lesser number of beacon stations.

The numeral 11 in Figure 3 designates a conventional radio frequency signal generator or oscillator circuit which may be any one of a large number of well known oscillator circuits capable of continually generating a stable radio frequency potential having an accurately known frequency. Since oscillator 11 defines the frequency or wavelength of operation of the system shown in Figure 1, oscillator 11 is preferably of the type whose output frequency is controlled by a piezo-electric crystal or any of its equivalents. While the output signal frequency of oscillator 11 may be any desired radio frequency, for most purposes a frequency in the range of about 50 to 5000 kilocycles per second, and preferably in the range of about 150 to 300 kilocycles per second, will be found satisfactory.

Oscillator 11 is preferably maintained continually in operation and a portion of the radio frequency output potential therefrom is supplied through conductors 12 to the input circuit of a radio frequency power amplifier, or transmitter, 13 which operates at the same frequency as oscillator 11. Transmitter 13 may be a conventional vacuum tube amplifier that derives its operating power through conductors 14 from a power source 15. Transmitter 13 is constructed in a manner such as to minimize as far as possible any net shift in phase, at the operating frequency, between the input and output thereof. Particular care is exercised to insure that the rate at which any net phase shift may change with time is negligibly small. During operation of transmitter 13, the output power thereof is supplied through conductors 16 to an antenna 17.

Since it is desired to radiate the master signal from transmitter 13 and antenna 17 during only a predetermined portion of a recurring time cycle, there is provided a master timing and keying system. This system may be of conventional electronic type wherein suitable electronic relay and/or gating tubes are actuated at predetermined times within the recurring time cycle by one or more multivibrators. Alternatively, however, this timing and keying system may be of an electromechanical type employing a constant speed motor which drives a plurality of either cam-and-lever or drum-type switches or the equivalent. In Figure 3 of the drawing, the timing and keying system has been shown as comprising a synchronous motor 18 which rotates an insulated shaft 19 on which are secured a plurality of drum-type switch elements having appropriate conductive segments, such as 20*a*, 20*b*, 20*c*, 20*d*, 20*e*, and 20*f*. These switch segments make and break contact with suitable brushes or sliding contact arms, such as 21*a*, 21*b*, 21*c*, 21*d*, 21*e* and 21*f*. The motor 18 is preferably driven from a constant frequency AC power source 22 so that the speed of the motor and the keying rate of the timing system will remain constant. As will be apparent to workers in the art, the power source 22 may comprise a stable, low frequency oscillator, such as a tuning fork-controlled oscillator, and a power amplifier adapted to supply the power requirements of motor 18.

The period of each time cycle employed in the operation of a system in accordance with my invention may be selected as desired. However, practical considerations dictate a period of about one-twentieth second or more. Accordingly, for illustrative purposes in the description of the accompanying figures of the drawing a period of one-twentieth second per cycle (i. e. 20 cycles per second) will be assumed, but this value is not to be taken as limiting.

In a preferred embodiment of my invention, the continuous radio waves emitted from the master station are radiated for a length of time approximately twice as long as the time of radiation of each beacon signal from the respective beacon stations. Furthermore, there is preferably a very brief gap, or silent period, between the emissions of the several transmitting stations operating in the system. Thus, in a system employing a master (or a mobile-master) station and two beacon stations, the master signal is preferably radiated for slightly less than one-half of each time cycle and each beacon signal, in turn, is radiated for slightly less than one-quarter of each time cycle. This is represented schematically in Figure 4 of the drawing wherein the 360 degrees of arc in a circle is employed to represent one cycle of operation of such a system and 0 degrees coincides with the beginning of the cycle and with the beginning of transmission of the master signal from the master station. The segment 23 of the circle, shown in Figure 4 between 0 and about 170 degrees of arc, represents the time during which the master signal is transmitted from the master (or mobile-master) station. During the time represented by segment 24 between about 170 and 180 degrees of arc, all stations in the system remain silent. The segment 25 between 180 and about 260 degrees of arc represents the time during which the beacon signal is transmitted from beacon station A. All stations again remain silent during the time represented by segment 26 between about 260 and 270 degrees of arc. During the time represented by segment 27 between 270 and about 350 degrees of arc, the beacon signal from beacon station B is transmitted. All stations remain silent again during the time represented by segment 28 between about 350 and 360 degrees of arc. Thereafter the time cycle is again repeated.

The above-described circular-time analogy will be helpful in understanding the timing and keying means of Figure 3 to which reference will now again be made. As may be seen in Figure 3, the drum switch segment 20*a* is analogous to the segment 23 of Figure 4 and, when interposed in conductor 14 and rotated twenty times per second (i. e. 1200 revolutions per minute) by synchronous motor 18, will cause transmitter 13 to be energized and produce keyed trains of continuous wave dashes twenty times per second. These relatively long dashes of radio frequency energy are radiated by antenna 17. Shortly after the termination of transmission of the master signal, a radio frequency receiver 29 is caused to be actuated by segment 20*b* of the drum switch carried on shaft 19. Segment 20*b* and the associated brush or contact arm 21*b* may be interposed in a conductor 30 which supplies operating potentials to receiver 29 from a receiver power source 31.

Figure 4:
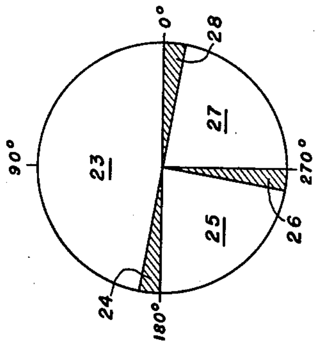
Figure 4 is a circular diagram illustrating certain time and keying, or switching, relations involved in the operation of a specific embodiment of apparatus in accordance with my invention.

By reference to Figures 3 and 4 of the drawing it may be seen that segment 20*b* should bear an angular orientation and relation to segment 20*a* similar to the angular orientation and relation between the sum of segments 25, 26, and 27, and the segment 23 of Figure 4 so that receiver 29 is deenergized during that portion of the operating cycle when transmitter 13 is in operation and is energized during those portions of the cycle when the beacon stations A and B are transmitting their respective beacon signals. If desired, the switch segment 20*b* may be enlarged sufficiently to cause receiver 29 to be energized during substantially the entire portion of the operating cycle when transmitter 13 is deenergized.

Since the system of the present invention employs keyed continuous (i. e. unmodulated) radio frequency waves of a single predetermined frequency for conveyance of the desired intelligence to remote distances, receiver 29 may be a simple radio frequency amplifier that is accurately tuned to the predetermined frequency and is devoid of commonly associated demodulating circuits. Receiver 29 may comprise a plurality of vacuum tube stages adapted to amplify received signals to a usable level with a minimum net phase shift between the input and output thereof. The amplifier should be so designed and constructed that any net phase shift is substantially independent of the level of the received signal and of other operating conditions. While the signal input to receiver 29 may be derived from any suitable auxiliary antenna, it is preferably derived from antenna 17 through conductors 32.

The radio frequency output signals from receiver 29 are introduced through conductors 33 into a phase-difference detector or phase comparator 34, and the phase thereof is there compared with the phase of radio frequency signals derived from master oscillator 11 and introduced thereinto through conductors 35. Phase comparator 34 may be a conventional circuit wherein two alternating current voltages having identical frequencies, but perhaps different phases with respect to each other, are combined and rectified to produce a direct current potential whose magnitude and/or polarity, with respect to a direct current biasing voltage, varies in direct relation to the difference in phases of the two input voltages.

The output, or "error," signal derived from phase comparator 34 is applied through suitable conductors, represented by the broken line 36, to one or more servo-systems in proper sequence.

As mentioned hereinbefore, it is assumed that the apparatus illustrated in Figure 3 is to be used in a surveying system employing two beacon stations, A and B. Accordingly, the output signal from phase comparator 34 is supplied through conductors 36 to suitably oriented segments 20*d* and 20*e* of the drum-type switch driven by synchronous motor 18. It may be seen that the angular orientations or segments 20*d* and 20*e* relative to segment 20*a* correspond, respectively, to the angular orientations of segments 25 and 27 relative to segment 23 in Figure 4 so that, during transmission of signals from beacon station A, the output of phase comparator 34 is supplied through conductors 36, switch segment 20*d*, and contact arm 21*d* to conductors 36*a* and thence into a first servo system 37. During transmission of signals from beacon station B, the output of phase comparator 34 is switched and supplied through conductors 36, switch segment 20*e*, contact arm 21*e*, and conductors 36*b* into a second servo system 38. When the master signal transmitter 13 is actuated, switch segments 20*d* and 20*e* do not connect the output of phase comparator 34 to either of servo systems 37 or 38.

Each of servo systems 37 and 38 may be conventional systems adapted to rotate mechanical linkage shafts 37*a* and 38*a*, respectively, in a proper direction and in an amount controlled by an error signal developed in phase comparator 34. For example, if phase comparator 34 be constructed to produce a maximum positive potential when the phase of the voltage introduced thereinto through conductors 33 leads by 90 degrees the phase of the voltage introduced through conductors 35, and to produce a maximum negative potential when the two phases differ by 270 degrees, servo systems 37 and 38 may comprise permanent magnet, direct current motors capable of rotating in one direction in response to a voltage of positive polarity and in the opposite directionin response to a voltage having negative polarity.

Rotatable shafts 37*a* and 38*a* may be coupled directly, or through suitable gear trains, to rotatable driving shafts of first and second phase shifting devices 39 and 40, respectively. Phase shifting devices 39 and 40 may be conventional goniometer devices or variable resistance-capacitance networks adapted to shift the current-voltage phase relations of an alternating current signal without producing a net shift in the frequency thereof.

A portion of the output signal derived from master oscillator 11 through branch conductors 12*a* and 12*b* is introduced through drum switch segments 20*c* and 20*f* into phase shifting devices 39 and 40. As may be seen from Figure 3 of the drawing, the angular relations of segments 20*c* and 20*d* are identical so that, when beacon station A is transmitting, the phase of the received beacon signal is compared in phase comparator 34′ with a phase-shifted signal derived from master oscillator 11 through conductors 12*a*, switch segment 20*c*, phase shifter 39 and conductors 35. Similarly, the angular relations of segments 20*e* and 20*f* upon shaft 19 are identical so that, when beacon station B is transmitting, the phase of the received beacon signal is compared in phase shifter 34 with a phase-shifted signal derived from master oscillator 11 through conductors 12*b*, switch segment 20*f*, phase shifter 40 and conductors 35.

Each of phase shifters 39 and 40 preferably carries, as for example, upon the ends of rotatable shafts 37*a* and 38*a*, means for indicating or recording the phase difference between the input and output signals thereof. Suitable indicating or recording means have been represented in the drawing by the dials 41 and 42. Indicating means 41 and 42 may be suitably calibrated and marked with indicia corresponding either to degrees of phase shift or to fractional parts of a wavelength at the known operating frequency. Alternatively, indicating means 41 and 42 may be calibrated and marked with indicia representing conventional units of length corresponding to the aforementioned fractional parts of a wavelength at the known operating frequency. Each of indicating means 41 and 42 preferably is provided with counting means adapted to indicate or record each full rotation of shafts 37*a* and 38*a*, thereby counting each complete 360-degree phase shift. From the foregoing description it may be seen that phase comparator 34, servo systems 37 and 38, phase shifters 39 and 40, comprise means for comparing the phases of beacon signals received by receiver 29 with the phase of master signals generated by oscillator 11, and that indicators 41 and 42 in combination with these elements provide means for displaying precise differences between the compared phases.

Referring now to Figure 5 there is shown a block diagram of an electrical circuit which, with appropriate modifications of the switching mechanism included therein, is adapted to be employed as any one of the beacon stations, such as beacon stations A or B mentioned in the description of Figures 1 and 2.

In Figure 5 the numeral 43 designates an antenna adapted to radiate signals generated by the beacon station and to intercept signals transmitted by the master (or mobile-master) station operating in the system. During portions of the operating cycle when signals are being received from the master station, the intercepted master signals are conveyed from antenna 43 by way of suitable conductors 44 to a receiver 45 which may receive operating potentials from a power source 46 by way of conductors 47.

Receiver 45 may be substantially identical to the receiver 29 of Figure 3 and, like receiver 29, is preferably constructed in a manner such as to produce no net shift in the phase of received signals between the input and output thereof. The signal voltage derived from receiver 45 is impressed, through conductors 48, upon one input circuit of a phase comparator 49 which may be substantially identical to the phase comparator 34 described in connection with Figure 3. In phase comparator 49, the phase of the received master signal is compared with the phase of a signal derived through conductors 50 from an adjustable radio frequency oscillator 51 which preferably operates continually.

Oscillator 51 is preferably a piezo-electric crystal oscillator of conventional type whose operating frequency can be altered slightly above and below the operating frequency of the master station by the variation of a variable capacitance, or other variable impedance, associated with the piezo-electric crystal. As will be more fully explained hereinafter the variation in the frequency of oscillator 51 may be adjusted by suitable rotation of a mechanical linkage shaft 52 connected to the aforesaid variable impedance element.

When there is a phase difference between the phase of the received master signal and the phase of the signal generated by oscillator 51, an error signal is produced by phase comparator 49. Similarly, when there is a small frequency difference between the frequency of the received master signal and the frequency of the signal generated by oscillator 51, there is inherently present a phase difference which likewise produces an error signal in phase comparator 49. In either case, the error signal from comparator 49 is introduced through conductors 53 into a servo system 54 which may be substantially identical to either of the servo systems 37 or 38 of Figure 3. Mechanical energy produced by servo system 54 is transmitted through rotation of a mechanical linkage shaft 55 and is used to drive a gear box 56. Gear box 56 is provided with a suitable gear train to drive two mechanical linkage shafts 52 and 57. As mentioned hereinbefore linkage shaft 52 is arranged to vary the variable impedance element associated with the piezo-electric crystal in oscillator 51 and thereby alter the operating frequency of the latter. Mechanical linkage shaft 57, on the other hand, imparts rotation to a phase shifting element within a phase shifting device 58 interposed in conductor 50 between phase comparator 48 and oscillator 51. Phase shifting means 58 may be substantially identical to phase shifter 39 or 40 of Figure 3.

As will be more fully explained hereinafter, the aforementioned elements of the apparatus shown in Figure 5 are adapted to make automatic adjustments for the following situations:

1. The frequency, and therefore the phase, of the signals received by receiver 45 differs from the frequency of the signals generated by oscillator 51, and 2. The frequency of the signals received by receiver 45 is identical to the frequency of the signals generated by oscillator 51 but the phases of the two groups of signals are different.

In the first situation, the signals introduced into phase comparator 49 from receiver 45 and from oscillator 51 (through phase shifter 58) produce an error signal which operates servo system 54 and thereby causes shafts 52 and 57 to be rotated until both the frequency of the generated signal and the phase thereof, as shifted by phase shifter 58, are substantially identical to the phase and frequency of the signals at the ouput of receiver 45. When this condition is met, phase comparator 49 produces no error signal and servo system 54 ceases to operate.

In the second situation, phase comparator 49 again produces an error signal which drives servo system 54 and causes shafts 52 and 57 to rotate. The rotation of shaft 52 momentarily changes the output frequency of oscillator 51 while the simultaneous rotation of shaft 57 shifts the phase of the signal derived from the oscillator. Ultimately, however, the resulting shift of both frequency and phase will result in the generation of a phase shifted signal whose frequency and phase are substantially identical to the phase and frequency of the signals appearing in the output from receiver 45.

The particular gear ratio to be employed in gear box 56 will depend upon a number of factors including the operating speed of servo system 54, the type of electric circuit employed in phase shifter 58, the type of frequency control employed in oscillator 51, and the structure of mechanism driven by shaft 52 for changing the frequency of oscillator 51 over a small range.

So that the simultaneous frequency- and phase-adjusting characteristics of the apparatus shown in Figure 5 may be better understood, let it be assumed that servo system 54 has been so constructed that the speed of rotation of shaft 55 is always directly proportional to the phase difference detected by phase comparator 49. Let it also be assumed that the gear ratio in box 56 and the frequency changing characteristics of the frequency-adjusting means in oscillator 51 are so constructed that a signal (on conductor 53 from phase comparator 49) equal to that due to a positive difference in phase of one degree would, in one second, result in a rotation of shaft 52 sufficient to increase the frequency of oscillator 51 by C cylces per second. Let it further be assumed that the gear ratio in box 56 and the phase-shifting characteristics of phase-shifting means 58 are so constructed that the above-mentioned signal would, in one second, decrease the phase difference by D degrees. Then the phase and frequency errors will vary with time in accordance with the function:

$$E \cos (\omega t+\alpha)\epsilon^{-\beta t}$$

where $\epsilon=2.7182$ . . ., E and $\alpha$ are dependent on the errors in frequency and phase at the time $t=0$, and where $\omega$ and $\beta$ are dependent on the quantities C and D that characterize the frequency-changing and phase-shifting relations mentioned above in accordance with the equations:

$$\beta=D/2$$
$$\omega^2=360C-\beta^2$$

If the length of the first fraction of the timing cycle (when the master station is operating) be taken as T seconds, then it is desirable for the product $\beta$T to exceed three. It is also desirable for $\omega$ to be reasonably small, say less than 300, but if consistent therewith, the product $\omega$T should exceed three.

Thus, suppose $T=0.02$ *second.*

Then if $\beta T=3$ and $\beta=150$, $D=300$.

And if $\omega T=5$ and $\omega=250$, $C=236$.

While shafts 52 and 57 have been shown as operating simultaneously, it will be apparent that the same result could be achieved if the servo system 54 were so constructed and arranged as to turn only shaft 52 until any frequency error was corrected and then to turn only shaft 57 until any phase error was corrected.

During that prearranged portion of the time cycle when the beacon station transmits its beacon signal, the frequency-corrected and phase-shifted signal derived from oscillator 51 through phase shifter 58 is supplied through branch conductors 50*a* to a transmitter 59 which may obtain operating potentials from a power source 60 through conductors 61. Transmitter 59 may be substantially identical to the transmitter 13 of Figure 3 and the output of the beacon station transmitter may be supplied through conductors 62 to antenna 43.

So that each beacon station will transmit its beacon signal in proper sequence and in proper time relation with respect to the signal transmitted by the master station, timed switching mechanism which is synchronized with the timing mechanism at the master station is required at each beacon station. In the case of a geographically fixed master station and similarly fixed beacon stations, time synchronization of the beacon stations can be achieved by direct electrical interconnection between the master timing mechanism and the beacon station timing mechanism by way of relatively long transmission lines. However, such direct electrical connection with mobile stations moving about at great distances from the master station is not possible and, accordingly, it is desirable that synchronization of all of the mobile and beacon stations should be achieved automatically from intelligence carried by the master radio signal. This synchronizing information is obtained in the system of my invention by causing the master signal to be transmitted for a substantially longer time in each cycle of operation than is any one of the beacon signals.

In the following description of the synchronizing and switching system shown in Figure 5, it should be borne in mind that, for purposes of illustration, it has been assumed: (1) that two beacon stations, such as A and B, are to be operated in conjunction either with a fixed master station M and a plurality of mobile stations X or with a single mobile-master station MX; (2) that the master station and each of the beacon stations transmits its respective signal twenty times per second; and (3) that the duration of each master signal is approximately twice as long as either of the beacon signals. These assumptions are in accord with the exemplification employed in connection with the description of Figure 3. With respect to the showing of the electro-mechanical switching system represented in Figure 5, it should be noted that all switches have been shown in the relative positions which they should occupy when the master station is beginning to transmit its master signal.

During transmission of the master signal, the receiver 45 at each beacon station is caused to be energized and the beacon transmitter 59 is caused to be silent, or de-energized, by the positioning of switching elements, such as the drum-type switch segments 63*b* and 63*a*, relative to associated contact arms, such as 64*b* and 64*a*, respectively interposed in conductors 47 and 61. The radio frequency voltage output derived from receiver 45, as mentioned hereinbefore, is applied to phase comparator 49 through conductors 48 and is, also simultaneously applied through conductors 48*a* to a radio frequency limiter circuit 65 which forms a first element in the time synchronizing system. Limiter 65 may be selected from a number of well known electronic circuits capable of limiting the positive and negative peaks of signals passing therethrough which might otherwise exceed a predetermined amplitude. If desired, limiter 65 may be of the pentode plate saturation type commonly employed in conventional frequency modulated broadcast receivers.

The output from limiter 65 is applied through conductors 66 to the input of a detector circuit 67 adapted to extract from the keyed continuous wave trains passing through receiver 45 and limiter 65 a direct current signal corresponding to the keyed duration of said wave trains. Detector 67 may be of the conventional diode rectifier type or the equivalent. The rectified output from detector 67 is substantially a series of positive-going rectangular waves which correspond in length to the duration of the keyed signals received by receiver 45, with spaces between the rectangular waves corresponding to silent periods between the keyed signals. This rectified output is applied through conductors 68 to the input of a conventional low-frequency amplifier 69 having an odd number of stages so that negative-going rectangular waves are obtained from the output thereof.

The resulting negative-going rectangular waves may be applied through conductors 70 to an integrating-type short pulse rejector, or pulse width discriminator 71. Pulse width discriminator 71 may be of the type described by Roberts on page 181 (Fig. 9-1) in "Radar Beacons," volume 3 of the M. I. T. Radiation Laboratory Series, published in 1947 by McGraw-Hill Book Co. While the circuit described by Roberts is designed to reject pulses of shorter duration than two micro seconds and to pass pulses of longer duration, it will be apparent to workers in the art that by suitable adjustment of the circuit constants, a similar circuit can be provided to respond to wave trains of longer duration than, for example, fifteen milliseconds and to discriminate against wave trains or pulses of shorter duration than about twelve milliseconds, such as might be produced by another beacon station.

The output of pulse width discriminator 71 is in the form of negative trigger pulses corresponding in time relation to the termination of transmission of the master station signal and these trigger pulses may be applied through conductors 72 as the frequency control, or comparison, signal to an automatic frequency control discriminator 73 which derives, through conductors 74, an A. C. voltage from a source (to be described hereinafter) whose frequency is to be controlled by the period of the master station signals.

Automatic frequency control discriminator 73 may be of a type commonly employed in television receivers and described by Deutsch on page 434 (Fig. 13–5) of "Theory and Design of Television Receivers," published by McGraw-Hill Book Co. The output signal from frequency control discriminator 73 is a D. C. potential whose magnitude is proportional to the difference between the frequency of the voltage derived through conductors 74 and the frequency control pulses derived through conductors 72. This output signal may be applied through conductors 75 as a bias voltage which synchronizes, or periodically adjusts, the frequency of a multivibrator 76.

Multivibrator 76 is preferably a free-running plate-to-grid feedback type multivibrator whose natural frequency may be very close to, or preferably precisely at, the keying rate of the master station (i. e. twenty cycles per second). The D. C. potential derived from frequency control discriminator 73 may then be applied, through conductors 75, to the grids of the multivibrator tubes in a manner such as to bias these grids slightly positive by an amount sufficient to synchronize the output frequency of the multivibrator in exact relation to the keying rate of the master station. Multivibrator 76 may be of the type described by Terman on pages 585–587 (Fig. 12–4) of "Radio Engineering" (3rd edition), published by McGraw-Hill Book Co., and synchronization of the multivibrator may be accomplished as described on pages 587–588 of the same text book.

The output signal derivable from multivibrator 76 through conductors 77 is substantially in the form of square waves which, after passage through a suitable low pass filter 78, is converted to a twenty-cycle, substantially sine wave voltage. This sine wave voltage is applied in part through conductors 74 to frequency control discriminator 73, as mentioned hereinbefore, and in part through conductors 79 to a twenty cycle power amplifier 80 capable of producing ample power in conductors 81 to drive a twenty cycle synchronous motor 82.

The speed of rotation of an insulated shaft 83 driven by synchronous motor 82 is dependent upon the frequency of the voltage applied to the motor. By maintaining this frequency constant, in a manner such as has been described above, the speed of rotation of shaft 83 is maintained constant and synchronized with the keying rate of the continuous wave radio signal received from the master station. It will be apparent to workers in the art that if the keying rate employed at the master station be chosen to be other than the twenty times per second employed for illustrative purposes herein, then the fundamental frequency of multivibrator 76 and the operating frequency of filter 78, power amplifier 80, and synchronous motor 82 should be similarly altered.

Synchronous motor 82 and its associated shaft 83, operating at constant rotational speed, may be employed to drive a drum-type switch containing switching segments 63*a* and 63*b*, mentioned hereinbefore, which segments are electrically interposed in conductors 47 and 61 which feed operating potentials to receiver 45 and transmitter 59, respectively. The above-mentioned drum-type switch preferably also includes a segment 63*c* with associated contact arm 64*c* interposed in conductor 53 whereby the output from phase comparator 49 may be electrically disconnected from servo system 54 during those portions of the operating cycle when receiver 45 is de-energized.

Switch segment 63*b*, associated with the energization of receiver 45, may be similar to the switch segment 20*a* of Figure 3 which is associated with the energization of the master station transmitter. However, since it is important that the beacon station receiver 45 should be momentarily operative after keying of the master transmitter is discontinued, switch segment 63*b* should provide contact for a slightly longer period than segment 20*a* of Figure 3 to insure that the trailing portion of the master signal is received and the time synchronizing elements associated with multivibrator 76 are permitted to operate. Instead of covering approximately 170 degrees of arc as in the case of switch segment 20*a*, the switch segment 63*b* preferably should include, for example, as much as 175 degrees of arc.

The switch segment 63*a* is arranged to control the keying of the beacon station transmitter 59. In the example employed herein for illustrative purposes, segment 63*a* may include approximately eighty degrees of arc. At beacon station A, which it is assumed will transmit its beacon signal immediately following the transmission of the master signal, the leading edge of segment 63*a* is preferably oriented substantially 180 degrees behind the leading edge of segment 63*b*. At beacon station B, the leading edge of segment 63*a* should be oriented 270 degrees behind the leading edge of segment 63*b*.

Switch segment 63*c* is provided for the purpose of de-energizing servo system 54 at those times when the master station signal is not being transmitted, thereby preventing "hunting" of the frequency and phase adjusting system when no signal is available from the master station for comparison purposes in phase comparator 49. Accordingly, segment 63*c* is preferably substantially identical to the segment 20*a* of Figure 3 and, furthermore, the leading edge of segment 63*c* is preferably oriented identically with the leading edge of segment 63*b*.

From the foregoing description of Figure 5 when considered in conjunction with the operations described with respect to Figures 1 and 2, it may be seen that the beacon stations, such as A and B, each comprise means for receiving master-signals and means for radiating an amplified facsimile of the master-signal as received at said beacon stations. It may be seen, also, that these stations include timing means, comprising multivibrator 76, filter 78, power amplifier 80, synchronous motor 82, and the several switching elements driven by motor 82. Furthermore, these stations include synchronizing means including limiter 65, detector 67, amplifier-inverter 69, pulse length discriminator 71, and frequency control discriminator 73. Taken together, the elements of the timing means and the elements of the synchronizing means provide a synchronized timing device capable of controlling reception of signals and confining the time of radiation of signals to selected fractions of a recurring time cycle which is set by the master station.

Turning now to Figure 6, there is shown a block diagram of an electrical circuit adapted to be used as the master station M in a system of the type described in connection with Figure 2. Since the various elements which make up this circuit may be identical to certain of the elements described with respect to the mobile-master station of Figure 3, these elements have been identified by similar numerals. Thus, it may be seen that there is provided a master radio frequency signal generator, or oscillator 11, which is preferably of the piezoelectric crystal controlled type. Oscillator 11 is connected through suitable conductors 12 to a radio frequency power amplifier, or transmitter 13. Operating potentials for transmitter 13 may be provided by a power source 15 through conductors 14. The radio frequency signal produced by oscillator 11 and amplified by transmitter 13 is applied through conductors 16 to an antenna 17 where it may be radiated in the form of keyed continuous wave signals. Keying of transmitter 13 at properly timed intervals may be accomplished by a timed switching mechanism comprising a synchronous motor 18 which drives an insulated shaft 19 carrying a drum-type switch, including the switch segment 20*a* and associate brush or contact arm 21*a*. Switch segment 20*a* and contact arm 21*a* may be electrically interposed in conductor 14 to control the keying of transmitter 13. Power for driving synchronous motor 18 is obtained from an A. C. power source 22 which is preferably of the constant frequency type referred to in connection with Figure 3.

Figure 7:
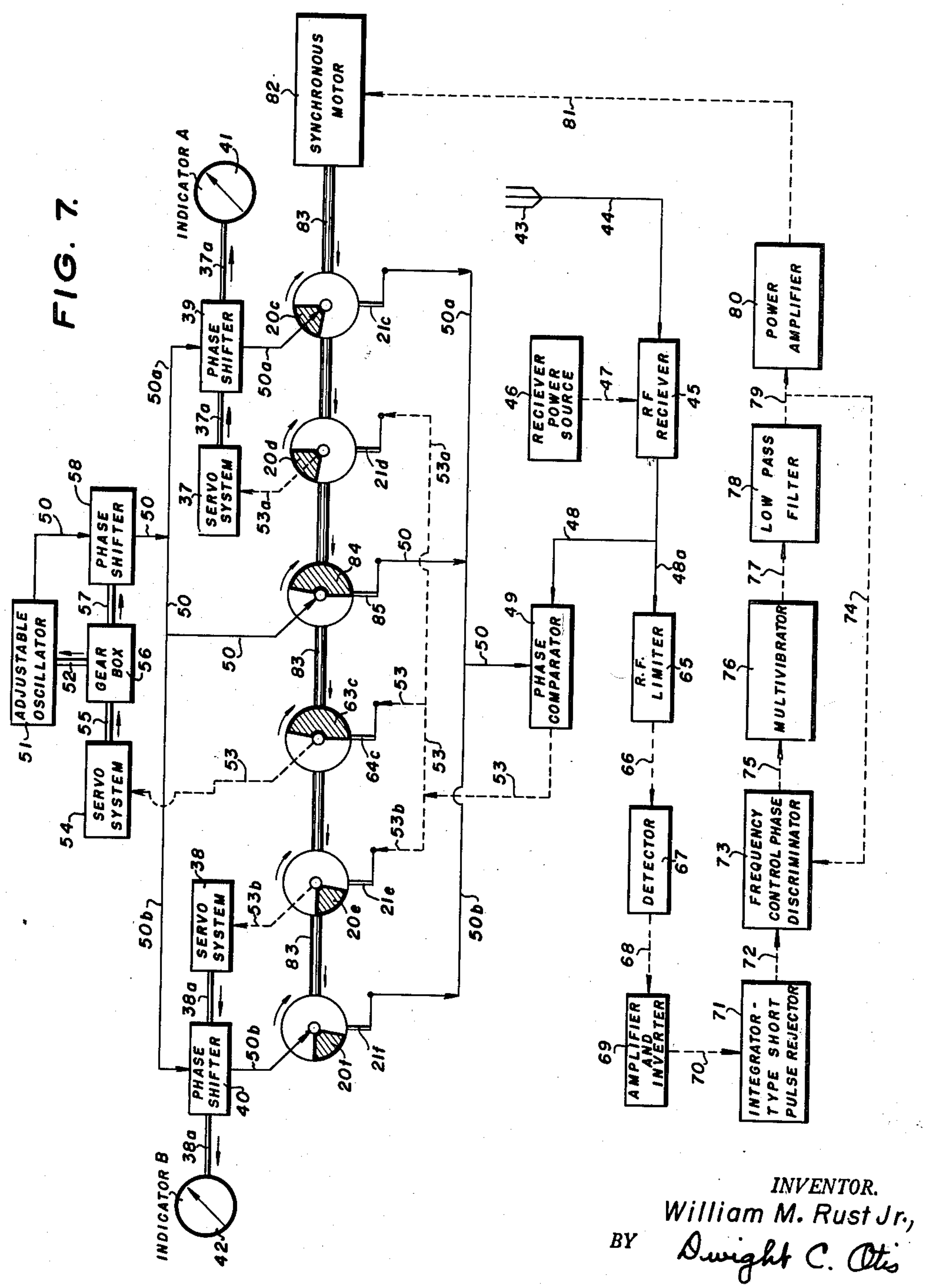
Figure 7 is a block diagram of an electrical circuit which may be used in each of a plurality of mobile stations in the embodiment illustrated by Figure 2.

A block diagram of an electrical circuit which may be employed in each of a plurality of mobile stations adapted to operate in accordance with the preferred embodiment of my invention, disclosed in connection with Figure 2, is shown in Figure 7. None of the mobile stations, in accordance with this embodiment of the invention, are required to transmit a radio signal, but each mobile station must be capable of receiving signals from a fixed master station and one or more fixed beacon stations in timed sequence so that indirect comparisons may be made between the phases of the received master and beacon signals. Certain groups of elements which have already been described in connection with Figure 3 and certain other groups of elements which have been described in connection with Figure 5, when combined in proper relation, can be made to produce the desired results. Accordingly, in the following description of Figure 7, a detailed description of the individual elements and their interconnection will not be given. Instead, those elements which are structurally and functionally the same as, or substantially similar to, the elements of Figure 3 will be referred to by the same reference characters shown on that figure of the drawing, and those elements which are structurally and functionally the same as, or similar to, the elements of Figure 5 will be referred to by identical reference characters shown on the latter figure.

Referring now specifically to Figure 7, signals intercepted by antenna 43 are introduced into receiver 45 which may receive operating potentials from power source 46. Unlike the apparatus of Figure 5, the apparatus of Figure 7 contains no transmitter and, hence no switch is employed between power source 46 and receiver 45 for periodically de-energizing the latter. Receiver 45 is permanently tuned to the prearranged operating frequency of the system and the output voltage therefrom is continuously applied to one input circuit of phase comparator 49 and also to the input of the time synchronizing system comprising limiter 65, detector 67, amplifier and inverter 69, pulse length discriminator 71, and frequency control discriminator 73. It may be noted here that the pulse length discriminator 71 specifically discriminates against the relatively short wave trains produced by the beacon station signals but responds to the relatively longer wave trains produced by the master station signal. The output of frequency control discriminator 73 is applied to multivibrator 76 whose output, after filtering in filter 78 and amplification in amplifier 80, is employed to drive synchronous timing motor 82. Rotation of insulated shaft 83 by synchronous motor 82 drives a plurality of switching elements including the segments 20*c*, 20*d*, 20*e*, 20*f*, 63*c* and a segment identified by the numeral 84.

During portions of the operating cycle when signals are being received from the master station, any error signal derived from phase comparator 49 is passed by way of switch segment 63*c* to servo system 34. This servo system, operating in conjunction with gear box 56, causes the frequency of adjustable oscillator 51 to be corrected and also causes the phase of the oscillator output to be shifted, by means of phase shifter 58 into predetermined relation with respect to the received master signal. The phase-shifted and frequency-adjusted output from phase shifter 58 is applied, through conductors 50 having switch segment 84 and its associated contact arm 85 interposed therein, to a second input circuit of phase comparator 49 for comparison with the received master signal. It should be apparent from the showing in the drawing that the switch segment 84 is substantially identical to the switch segment 63*c* and the angular orientation of both segments upon shaft 83 is the same.

As the operating cycle progresses, switch segments 63*c* and 84 break contact with their associated contact arms and switch segments 20*c* and 20*d* make contact with the associated contact arms 21*c* and 21*d* thereby causing the output of phase comparator 49 to be introduced through switch segment 20*d* into servo system 37. Simultaneously, the switch segment 20*c* completes an electrical circuit from the output of phase shifter 58, by way of conductors 50 and branch conductors 50*a*, into phase shifter 39 and thence into phase comparator 49. If a phase difference exists between the frequency and phase adjusted signal, derived from oscillator 51 and phase shifter 58, and the received beacon signal entering phase comparator 49, an error signal is produced. This error signal operates servo system 37 and causes the latter to turn a phase shifting element within phase shifter 39 sufficient to compensate for the phase error. Operation of servo system 37 also causes the phase change to be registered by indicator 41. The indications provided by indicator 41 are indicative of the differential range of the mobile station from the master station M and the first beacon station A.

As the operating cycle progresses still further, switch segments 20*c* and 20*d* move out of contact with their associated contact arms, and switch segments 20*e* and 20*f* make contact with arms 21*e* and 21*f*. This switching action causes servo system 38, phase shifter 40 and indicator 42 to become activated and perform, with respect to the second beacon signal, the operations described above relative to servo system 37, phase shifter 30, indicator 41 and the first beacon signal.

From the foregoing description it will become apparent to workers in the art that, for some purposes, only one beacon station will be sufficient to provide the desired range and/or position indication. For other purposes, a second or even a third beacon station operating in conjunction with a single master station may be required. It is to be understood that my invention contemplates such variations including a fewer or greater consequent number of elements, such as servo systems 37 and 38, phase shifters 39 and 40, and phase indicators 41 and 42, in beacon and mobile stations, as the particular system may require.

In the above description of my invention, reference has been made broadly to a timing cycle and to successive fractions of said cycle. The total time employed for each said cycle may be adjusted to any predetermined value so long as all stations included in the system are responsive to this predetermined value. Several factors influence the optimum length of time required for each cycle including the number of stations which share time upon the selected frequency channel, the speed of operation or responsiveness of various elements of the apparatus to phase changes, the magnitude of apparatus adjustments which are required to be made in successive fractions of each cycle, and the magnitude of any cycle fractions which may be provided during which no station in the system is radiating a signal. In a preferred embodiment of my invention, the period of each time cycle of operation of the several stations in the system may be about 0.05 second and each successive cycle is divided so that the master station radiates master signals during approximately the first half of the cycle and each of two beacon stations radiates its respective beacon signal, in prearranged order, during approximately successive later quarters of said cycle.

In the foregoing description of the several figures of the drawing it has been stated that transmitters 13 and 59, and receivers 29 and 45 should be so constructed as to eliminate as far as possible any net shift in phase of signals passing therethrough and it has been assumed that no phase shifts occurred anywhere in the electrical apparatus except in elements specifically designated to produce a controlled phase shift. It will be apparent to workers in the art that, in practice, complete elimination of phase shift through several elements of apparatus is attainable only at great expense, if at all. It will also be apparent that phase delays through the several elements can, with reasonable care, be made substantially constant and, therefore, independent of the distances which are to be measured. Hence, in the foregoing description and in the appended claims, it will be understood that the term "predetermined phase difference" contemplates a phase difference which may involve a resulting constant correction factor.

While particular circuits and combinations of elements have been shown and described herein for purposes of illustration, it will be understood that other equivalent circuits and elements thereof may be substituted without departing from the spirit and scope of the present invention as defined in the appended claims.

What I claim as new and useful, and desire to secure by Letters Patent is:

1. A radio frequency navigation or surveying system comprising: a first station which includes means for continually generating a first continuous wave signal having a single predetermined radio frequency, means for radiating said first continuous wave signal, and a first timed keying means associated with said radiating means for causing said first signal to be radiated throughout only a first fixed portion in each of a plurality of successive cycles of operation; and a second station spaced at a substantial distance from said first station, said second station including means for receiving successive signals radiated by said first station, means for continually generating a second continuous wave signal having said predetermined radio frequency, means for shifting the phase of said second signal to a predetermined phase difference relative to the phase of said first signal as received at the second station, means for radiating the resulting phase-shifted second continuous wave signal, a second timed keying means associated with the last-mentioned radiating means for causing said phase-shifted second signal to be radiated throughout only a prearranged fixed portion other than said first portion in each of said cycles of operation, and means responsive to intelligence carried by the signal radiated from said first station for synchronizing said second timed keying means in prearranged relation to said first timed keying means.

2. A system in accordance with claim 1 wherein the means for radiating said second signal is arranged at a fixed location and said first station is adapted to move relative thereto, and wherein said first station also includes means for receiving successive signals radiated by said second station, and means for indicating phase differences between said continually generated first signal and the successive signals received at said first station from said second station.

3. A system in accordance with claim 1 wherein the respective means for radiating said first and said second signals are arranged at spaced-apart fixed locations and said system also includes a third station adapted to move relative to said locations, and wherein said third station includes means for receiving the successive signals radiated from said first and said second stations, timing means associated with the receiving means at said third station for distinguishing between said first and said other fixed portions in each of said cycles of operation, means responsive to intelligence carried by the signal radiated from said first station for synchronizing said timing means in prearranged relation to said first timed keying means, means for continually generating a third continuous wave signal having said predetermined radio frequency, means for shifting the phase of said third signal to a predetermined phase difference relative to the phase of said first signal as received at said third station, and means for indicating phase differences between the resulting phase-shifted third signal and successive signals received at said third station from said second station.

4. A radio navigation or surveying system operating at a single selected radio frequency comprising, in combination: means for radiating a first continuous wave signal having said selected radio frequency at a first fixed location, timed keying means associated with said radiating means for confining radiations of said first continuous wave signal to only a first fixed portion in each of a plurality of successive operating cycles; means for receiving the resulting radiated first signal at a second location spaced a substantial distance from said first location, means for continually generating a second continuous wave signal having said selected frequency, means for shifting the phase of said second signal to a predetermined phase difference relative to the phase of said first radiated signal as received at said second location, means for radiating the resulting phase-shifted second continuous wave signal at said second location, a second timed keying means associated with the last-mentioned radiating means for confining radiations of said phase-shifted second continuous wave signal to only a second fixed portion subsequent to said first fixed portion in each of said cycles of operation, means responsive only to intelligence carried by said radiated first signal as received at said second location for synchronizing said second timed keying means in prearranged relation to the timed keying means at said first location; means for receiving said radiated first signal at a third location spaced a substantial distance from both said first and said second locations, means for continually generating a third continuous wave signal having said selected frequency, means for shifting the phase of said third signal to a predetermined phase difference relative to the phase of said first radiated signal as received at said third location, means for radiating the resulting phase-shifted third continuous wave signal at said third location, a third timed keying means associated with the radiating means at said third location for confining radiations of said phase-shifted third signal to only a third fixed portion subsequent to said second fixed portion in each of said cycles of operation, and means responsive only to intelligence carried by said radiated first signal as received at said third location for synchronizing said third timed keying means in prearranged relation to the timed keying means at said first location.

5. A system in accordance with claim 4 comprising in combination therewith: means for receiving said first, second, and third radiated signals at a fourth location adapted to move freely relative to said first, second, and third locations, timing means associated with the last-mentioned receiving means for distinguishing between said first, second, and third fixed portions in each of said cycles of operation, said timing means including means responsive only to intelligence carried by said radiated first signal as received at said fourth location for synchronizing said timing means in prearranged relation to the timed keying means at said first location, means for continually generating a local continuous wave signal having said selected frequency, means for shifting the phase of said local signal to a predetermined phase difference relative to said radiated first signal as received at said fourth location, and means for indicating successive phase differences between the resulting phase-shifted local signal and said radiated second and third signals, respectively, as received at said fourth location.

References Cited in the file of this patent

UNITED STATES PATENTS

| | | |
|---|---|---|
| 2,490,394 | Williams | Dec. 6, 1949 |
| 2,502,662 | Mitchell | Apr. 4, 1950 |
| 2,531,919 | O'Brien | Nov. 28, 1950 |